US012710071B2

(12) United States Patent
Li et al.

(10) Patent No.: US 12,710,071 B2
(45) Date of Patent: *Aug. 18, 2026

(54) TILT PAD JOURNAL BEARING WITH LUBRICATION ARRANGEMENT

(71) Applicant: Elliott Company, Jeannette, PA (US)

(72) Inventors: Wei Li, Delmont, PA (US); Manish Rambhau Thorat, Monroeville, PA (US); Brian Christopher Pettinato, Greensburg, PA (US); Christopher Joseph Braman, Irwin, PA (US)

(73) Assignee: Elliott Company, Jeannette, PA (US)

( * ) Notice: Subject to any disclaimer, the term of this patent is extended or adjusted under 35 U.S.C. 154(b) by 23 days.

This patent is subject to a terminal disclaimer.

(21) Appl. No.: 18/904,311

(22) Filed: Oct. 2, 2024

(65) Prior Publication Data

US 2025/0020159 A1 Jan. 16, 2025

Related U.S. Application Data

(63) Continuation of application No. 17/899,792, filed on Aug. 31, 2022, now Pat. No. 12,135,057.

(51) Int. Cl.
*F16C 17/03* (2006.01)
*F16C 33/10* (2006.01)

(52) U.S. Cl.
CPC ............ *F16C 17/03* (2013.01); *F16C 33/106* (2013.01)

(58) Field of Classification Search
CPC ........ F16C 17/03; F16C 17/035; F16C 17/06; F16C 17/065; F16C 33/1045; F16C 33/106; F16C 33/105
See application file for complete search history.

(56) References Cited

U.S. PATENT DOCUMENTS 3,004,804 A 10/1961 Pinkus et al.
3,454,312 A 7/1969 Bielec
(Continued)

FOREIGN PATENT DOCUMENTS

WO 0181781 A1 11/2001
WO 2015175341 A1 11/2015
(Continued)

OTHER PUBLICATIONS

Bielec et al., "Tilting Pad Thrust Bearings: Factors Affecting Performance and Improvements with Directed Lubrication", Proceedings of Institute of Mechanical Engineers, 1969, pp. 93-102, vol. 184, Issue 12.

(Continued)

*Primary Examiner* — James Pilkington
(74) *Attorney, Agent, or Firm* — The Webb Law Firm

(57) ABSTRACT

A tilt pad journal bearing for supporting a rotating shaft includes an annular support ring and a plurality of arcuate pads tiltably mounted in the annular support ring and circumferentially spaced apart from each other. The tilt pad journal bearing further has a lubrication arrangement disposed between each pair of the plurality of arcuate pads. The lubrication arrangement includes a lubrication manifold connected to the annular support ring and recessed relative to a shaft support surface of adjacent arcuate pads to define an oil mixing cavity, and a plurality of lubrication nozzles protruding from the lubrication manifold into the oil mixing cavity. A cross-sectional flow area of at least one of the plurality of lubrication nozzles positioned toward a center of the lubrication manifold is larger than a cross-sectional flow area of a remainder of the plurality of nozzles.

20 Claims, 4 Drawing Sheets

(56) References Cited

U.S. PATENT DOCUMENTS

| | | | | |
|---|---|---|---|---|
| 5,288,153 | A | 2/1994 | Gardner | |
| 5,518,321 | A | 5/1996 | Hata | |
| 5,702,186 | A | 12/1997 | Hackstie et al. | |
| 5,738,447 | A | 4/1998 | Nicholas | |
| 5,795,076 | A | 8/1998 | Ball et al. | |
| 6,361,215 | B1 | 3/2002 | Wilkes et al. | |
| 7,237,957 | B2 | 7/2007 | Geiger | |
| 9,746,024 | B2 | 8/2017 | Sato et al. | |
| 9,759,257 | B2 | 9/2017 | Sano | |
| 10,274,010 | B2 | 4/2019 | Kawashima et al. | |
| 11,035,404 | B2 | 6/2021 | Nakano et al. | |
| 11,255,377 | B2 | 2/2022 | Hagiya et al. | |
| 12,135,057 | B2 * | 11/2024 | Li | F16C 17/243 |
| 2015/0132105 | A1 | 5/2015 | Hemmi et al. | |

FOREIGN PATENT DOCUMENTS

| | | | |
|---|---|---|---|
| WO | 2018058103 | A1 | 3/2018 |
| WO | 2018077884 | A1 | 5/2018 |

OTHER PUBLICATIONS

Brockwell et al., "Performance Evaluation of the LEG Tilting Pad Journal Bearing," Presented at the Institution of Mechanical Engineers Seminar Plain Bearings-Energy Efficiency and Design, 1992, pp. 51-58.

Decamillo et al., "Journal Bearing Vibration and SSV Hash", Proceedings of the Thirty-Seven Turbomachinery Symposium, 2008, pp. 11-23.

Dmochowski et al., "A Study of the Thermal Characteristics of the Leading Edge Groove and Conventional Tilting Pad Journal Bearings", Journal of Tribology, Apr. 1993, pp. 219-226, vol. 115.

Dmochowski et al., "Effect of Oil Evacuation on the Static and Dynamic Properties of Tilting Pad Journal Bearings," Tribology Transactions, 2006, pp. 536-544, vol. 49.

Edney et al., "Profiled Leading Edge Groove Tilting Pad Journal Bearing For Light Load Operation", Proceedings of the Twenty-Fifth Turbomachinery Symposium, 1996.

Edney et al., "Testing, Analysis, and CFD modeling of a Profiled Leading Edge Groove Tilting Pad Journal Bearing", Presented at the International Gas Turbine & Aeroengine Congress & Exhibition, 1998.

Hagemann et al., "Measured and Predicted Operating Characteristics of a Tilting-Pad Journal Bearing with Jacking- Oil Device at Hydrostatic, Hybrid, and Hydrodynamic Operation", Lubricants, 2018, vol. 6, No. 81.

Harangozo et al., "The Effect of Different Lubrication Methods on the Performance of a Tilting-Pad Journal Bearing", Tribology Transactions, 1991, pp. 529-536, vol. 34, No. 4.

Herbage, "High Efficiency Fluid Film Thrust Bearings for Turbomachinery", Texas A&M University, Gas Turbine Laboratories, 1977.

Nicholas, Tilting Pad Journal Bearings with Spray-Bar Blockers and By-Pass Cooling for High Speed, High Load Applications, Proceedings of the 32nd Turbomachinery Symposium, Sep. 2003, pp. 27-27.

Tanaka, "Thermohydrodynamic Performance of a Tilting Pad Journal Bearing in Spot Lubrication", Journal of Tribology, Jul. 1991, pp. 615-619, vol. 113.

* cited by examiner

TILT PAD JOURNAL BEARING WITH LUBRICATION ARRANGEMENT

CROSS REFERENCE TO RELATED APPLICATION(S)

This application claims priority to U.S. patent application Ser. No. 17/899,792, filed on Aug. 31, 2022, the disclosure of which is incorporated by reference in its entirety.

BACKGROUND OF THE DISCLOSURE

Field of the Disclosure

This disclosure relates generally to tilt pad journal bearings, and more particularly, to a tilt pad journal bearing having a lubrication arrangement for delivering lubricant to an interface between a rotating shaft and the journal bearing.

Description of Related Art

Turbomachines, such as centrifugal flow compressors, axial flow compressors, and turbines may be utilized in various industries. Centrifugal flow compressors and turbines, in particular, have a widespread use in power stations, jet engine applications, gas turbines, and automotive applications. Centrifugal flow compressors and turbines are also commonly used in large-scale industrial applications, such as air separation plants and hot gas expanders used in the oil refinery industry. Centrifugal compressors are further used in large-scale industrial applications, such as refineries and chemical plants.

With reference to FIG. 1, a multi-stage, centrifugal-flow turbomachine 10 is illustrated in accordance with a conventional design. In some applications, a single stage may be utilized. Such turbomachine 10 generally includes a shaft 20 supported within a housing 30 by at least two bearings 40. Turbomachine 10 shown in FIG. 1 includes a plurality of stages to progressively increase the fluid pressure of the working fluid. Each stage is successively arranged along the longitudinal axis of turbomachine 10 and all stages may or may not have similar components operating on a same principle.

The purpose of bearings in turbomachinery applications is to reliably support a spinning rotor with minimal friction, and to provide necessary stiffness and damping characteristics for low vibration. The vast majority of bearings for turbomachinery utilize oil for this purpose.

One type of oil-fed bearing that is commonly used in turbomachinery applications is a tilt pad bearing which has a plurality of tilting pads disposed about a circumference of the shaft. To improve the efficiency of turbomachines, an increased rotor speed is frequently required, which often leads to an increase in the bearing metal temperature. Consequently, thermal performance of the bearings becomes a major limiting factor for the design of fluid film journal bearings. A disadvantage of many tilt pad bearings is that hot oil from an upstream pad can flow to the downstream pad, thereby increasing the power loss and the bearing metal temperature while reducing the bearing performance. In view of the above, there is a need in the prior art for a tilt pad journal bearing with improved lubrication properties for reduced power loss and bearing metal temperature.

SUMMARY OF THE DISCLOSURE

In accordance with some non-limiting embodiments or aspects, provided is a tilt pad journal bearing for supporting a rotating shaft. The tilt pad journal bearing may include an annular support ring and a plurality of arcuate pads tiltably mounted in the annular support ring and circumferentially spaced apart from each other. Each of the plurality of arcuate pads may have a mounting surface opposite a shaft support surface. The tilt pad journal bearing further may include a lubrication arrangement disposed between each pair of the plurality of arcuate pads. The lubrication arrangement may include a lubrication manifold connected to the annular support ring and recessed relative to the shaft support surface of adjacent arcuate pads to define an oil mixing cavity, and a plurality of lubrication nozzles protruding from the lubrication manifold into the oil mixing cavity. A cross-sectional flow area of at least one of the plurality of lubrication nozzles positioned toward a center of the lubrication manifold may be larger than a cross-sectional flow area of a remainder of the plurality of nozzles positioned away from the center of the lubrication manifold.

In accordance with some non-limiting embodiments or aspects, the annular support ring may have a lubricant delivery hole in fluid communication with the lubrication manifold and each of the plurality of lubrication nozzles. The plurality of lubrication nozzles may be three lubrication nozzles. The plurality of lubrication nozzles may be evenly or unevenly spaced apart from each other along the lubrication manifold. At least one of the plurality of lubrication nozzles with the larger cross-sectional flow area may have 33% to 200% more flow area than any of the remaining individual lubrication nozzles.

In accordance with some non-limiting embodiments or aspects, at least one of the plurality of lubrication nozzles may have a circular or an oval cross-sectional flow area. At least one of the plurality of lubrication nozzles may have a prismatic outer shape.

In accordance with some non-limiting embodiments or aspects, the lubrication manifold may include at least one threaded hole. The lubrication manifold may be connected to the annular support ring via a fastener threadably engaged with the at least one threaded hole.

In accordance with some non-limiting embodiments or aspects, the tilt pad journal bearing further may include a spherical pivot seat in contact with the mounting surface of each of the plurality of arcuate pads. The spherical pivot seat may be connected to an inner surface of the annular support ring.

In accordance with some non-limiting embodiments or aspects, an upper surface of the plurality of lubrication nozzles may be recessed relative to the shaft support surface of adjacent arcuate pads. The tilt pad journal bearing further may include a pair of end seals connected to the annular support ring. At least one temperature transducer may be connected to at least one of the plurality of arcuate pads. The at least one of the plurality of lubrication nozzles with the larger cross-sectional flow area may be positioned in axial alignment with the at least one temperature transducer.

In accordance with some non-limiting embodiments or aspects, a tilt pad journal bearing for supporting a rotating shaft may include an annular support ring and a plurality of arcuate pads tiltably mounted in the annular support ring and circumferentially spaced apart from each other. Each of the plurality of arcuate pads may have a mounting surface opposite a shaft support surface. The tilt pad journal bearing further may include a lubrication arrangement disposed between each pair of the plurality of arcuate pads. The lubrication arrangement may include a lubrication manifold connected to the annular support ring and recessed relative to the shaft support surface of adjacent arcuate pads to define an oil mixing cavity, and a plurality of lubrication nozzles protruding from the lubrication manifold into the oil mixing cavity. A cross-sectional flow area of at least one of the plurality of lubrication nozzles positioned toward a center of the lubrication manifold may be larger than a cross-sectional flow area of a remainder of the plurality of nozzles positioned away from the center of the lubrication manifold. An upper surface of the plurality of lubrication nozzles may be recessed relative to the shaft support surface of adjacent arcuate pads. The annular support ring may have a lubricant delivery hole in fluid communication with the lubrication manifold and each of the plurality of lubrication nozzles.

In accordance with some non-limiting embodiments or aspects, at least one of the plurality of lubrication nozzles with the larger cross-sectional flow area may have 33% to 200% more flow area than any of the remaining individual lubrication nozzles. At least one of the plurality of lubrication nozzles may have a circular or oval cross-sectional flow area. At least one of the plurality of lubrication nozzles may have a prismatic outer shape.

In accordance with some non-limiting embodiments or aspects, an upper surface of the plurality of lubrication nozzles may be recessed relative to the shaft support surface of adjacent arcuate pads. A pair of end seals may be connected to the annular support ring. At least one temperature transducer may be connected to at least one of the plurality of arcuate pads. The at least one of the plurality of lubrication nozzles with the larger cross-sectional flow area may be positioned in axial alignment with the at least one temperature transducer.

These and other features and characteristics of the present disclosure, as well as the methods of operation and functions of the related elements of structures and the combination of parts and economies of manufacture, will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

DESCRIPTION OF THE DISCLOSURE

Figure 1:
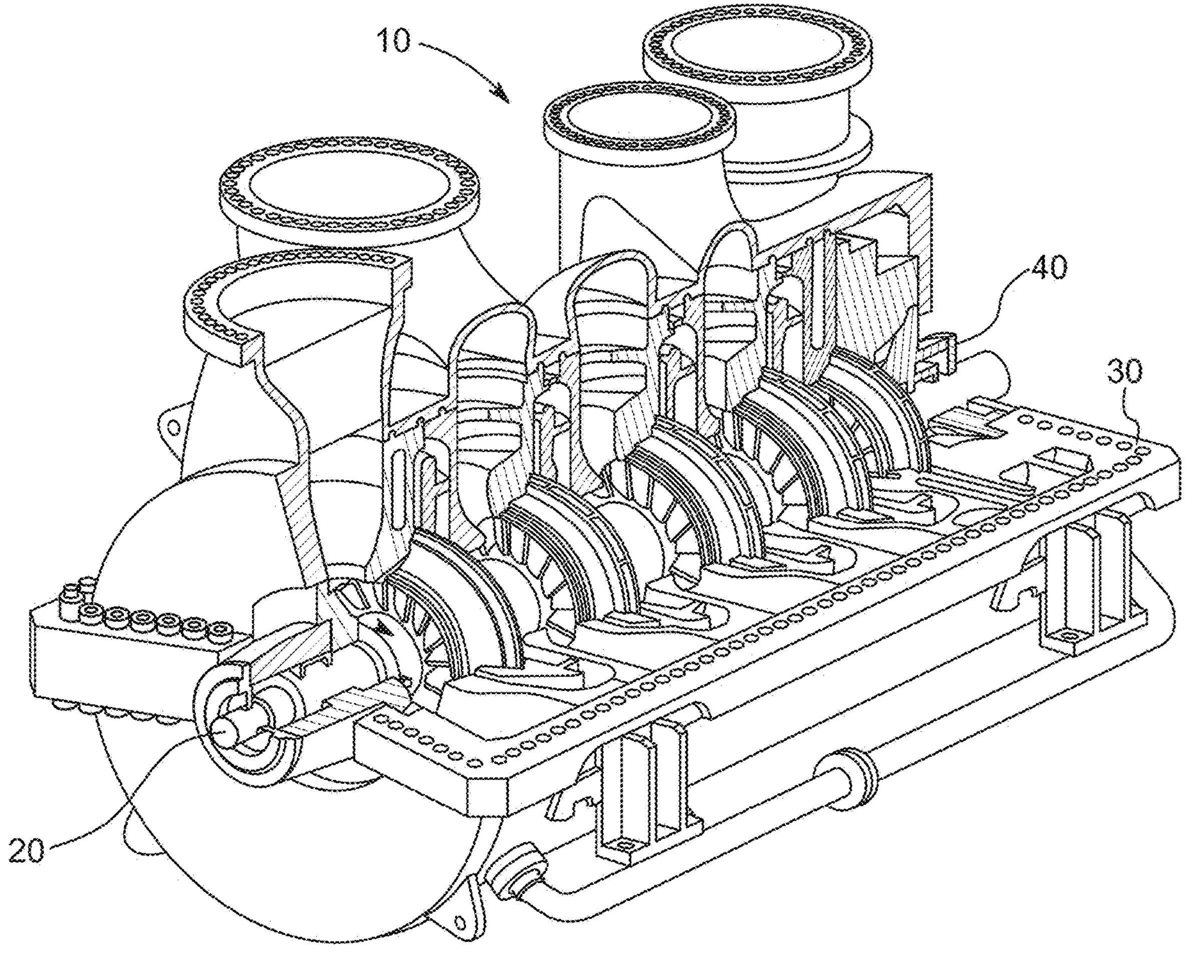
FIG. 1 is a partial-cutaway perspective view of a multi-stage, centrifugal-flow turbomachine in accordance with a prior art embodiment.

As used herein, the singular form of "a", "an", and "the" include plural referents unless the context clearly dictates otherwise.

Spatial or directional terms, such as "left", "right", "inner", "outer", "above", "below", and the like, relate to the embodiments or aspects as shown in the drawing figures and are not to be considered as limiting as the embodiments or aspects can assume various alternative orientations.

All numbers used in the specification and claims are to be understood as being modified in all instances by the term "about". By "about" is meant within plus or minus twenty-five percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

All documents referred to herein are "incorporated by reference" in their entirety.

The term "at least" is synonymous with "greater than or equal to".

As used herein, "at least one of" is synonymous with "one or more of". For example, the phrase "at least one of A, B, or C" means any one of A, B, or C, or any combination of any two or more of A, B, or C. For example, "at least one of A, B, and C" includes A alone; or B alone; or C alone; or A and B; or A and C; or B and C; or all of A, B, and C.

The word "comprising" and "comprises", and the like, does not exclude the presence of elements or steps other than those listed in any claim or the specification as a whole. In the present specification, "comprises" means "includes" and "comprising" means "including".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular", "transverse", "substantially perpendicular", or "substantially transverse" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The present disclosure is directed to, in general, a bearing 200, which may be a tilt pad journal bearing having a lubrication arrangement for increased bearing performance. The lubrication arrangement is configured to direct lubricant, such as oil, to the rotating shaft. Certain preferred and non-limiting embodiments or aspects of the components of the bearing 200 are illustrated in FIGS. 2-6. The present disclosure is also directed to, in general, a turbomachine that utilizes the aforementioned bearing 200. The bearing 200 is configured to be contained within a casing of a turbomachine. In some embodiments or aspects, the bearing 200 may be configured for use with a turbomachine, such as the turbomachine 10 shown in FIG. 1. A plurality of bearings 200 may be spaced apart in multiple stages along the axial length of the shaft of the turbomachine.

Figure 2:
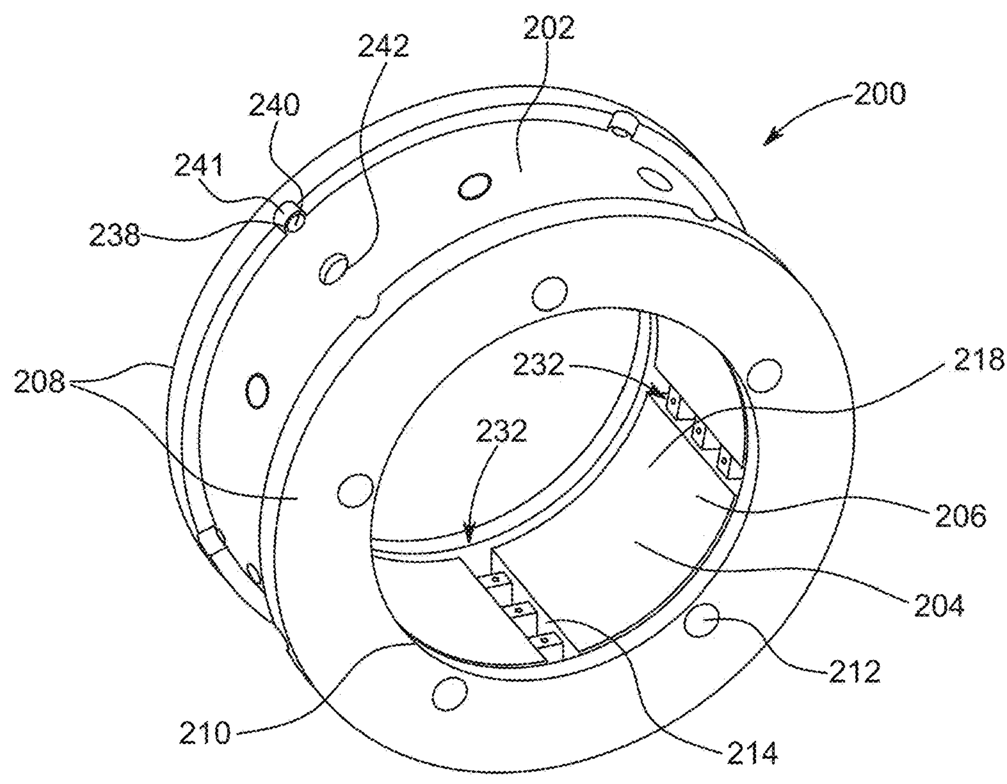
FIG. 2 is a perspective view of a tilt pad journal bearing in accordance with some non-limiting embodiments or aspects of the present disclosure.
Figure 3:
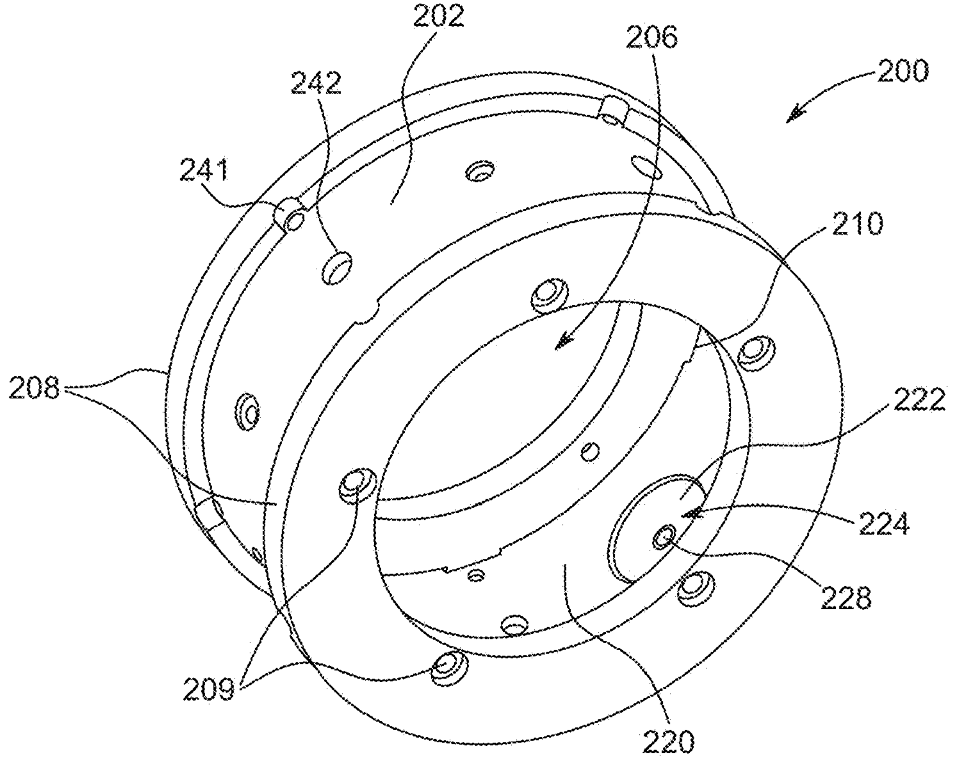
FIG. 3 is a perspective view of an annular support ring of the bearing shown in FIG. 1.

With reference to FIGS. 2-3, the bearing 200 includes an annular support ring 202 and a plurality of arcuate pads 204 supported in the annular support ring 202. The annular support ring 202 may be a monolithic structure having a central opening 206. In some embodiments or aspects, the annular support ring 202 may be a modular component constructed from a plurality of discrete ring or arc segments that are combined together to form the annular support ring 202. The discrete ring or arc segments may be removably connectable together one or more fasteners. In some embodiments or aspects, dowels, pins, or other structures may be provided for locating the discrete ring or arc segments relative to each other.

With continued reference to FIGS. 2-3, the bearing 200 further includes a pair of side plates 208 axially spaced from each other on opposing sides of the annular support ring 202. The side plates 208 are ring-shaped and include a central aperture 210 sized to receive a rotor shaft, such as the shaft 20 of the turbomachine 10 shown in FIG. 1. The side plates 208 are configured to be removably connectable to the respective opposing sides of the annular support ring 202. In some embodiments or aspects, the side plates 208 may be integrally formed with the annular support ring 202. Each side plate 208 has a plurality of openings 209 (shown in FIG. 3) configured to receive a corresponding plurality of retaining fasteners 212 (shown in FIG. 2) for axially and radially retaining the arcuate pads 204. In some embodiments or aspects, each arcuate pad 204 may be secured by a pair of retaining fasteners 212. In use, the side plates 208 axially and radially retain the plurality of arcuate pads 204 and suppress axial leakage of lubricant, as discussed herein. As such, each of the side plates 208 defines an end seal.

With reference to FIG. 2, the arcuate pads 204 are received within the central opening 206 of the annular support ring 202 and are circumferentially spaced apart from each other such that a gap or space 214 exists between adjacent arcuate pads 204. In some embodiments or aspects, the bearing 200 may have five arcuate pads 204. In other embodiments or aspects, the bearing 200 may have more or fewer arcuate pads 204. Each of the plurality of arcuate pads 204 has a mounting surface 216 (shown in FIG. 7) opposite a shaft support surface 218. The mounting surface 216 is configured for tiltably supporting the arcuate pad 204 on an inner surface 220 (shown in FIG. 3) of the annular support ring 202 via a spherical pivot seat, as described hereinafter. The shaft support surface 218 is configured to be in bearing contact with the rotor shaft supported by the bearing 200.

Figure 7:
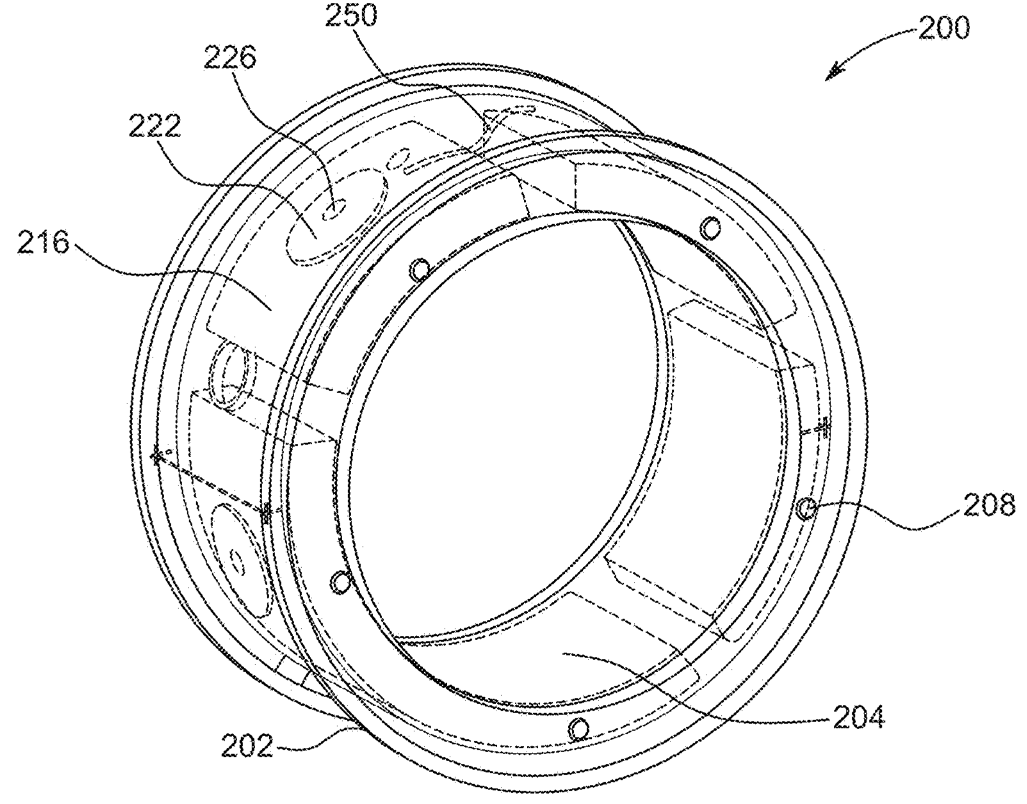
FIG. 7 is a perspective view of a tilt pad journal bearing in accordance with another embodiment or aspect showing a temperature transducer.

As shown in FIG. 7, the mounting surface 216 of each arcuate pad 204 has a pocket configured for contacting a spherical pivot seat 222 that is received within a pocket 224 (shown in FIG. 3) on the annular support ring 202. The spherical pivot seat 222 may be secured within the pocket 224 by a fastener 226 extending through a hole 228 (shown in FIG. 3) in the annular support ring 202. The spherical pivot seat 222 is configured to facilitate tilting movement of the actuate pads 204 about an axis that is parallel to a longitudinal axis of the bearing 200.

With reference to FIG. 2, the bearing 200 has a lubrication arrangement 232 disposed between each pair of the plurality of arcuate pads 204. The lubrication arrangement 232 is configured to deliver a lubricant, such as lubricating oil, to the rotor shaft. The discussion of the lubrication arrangement 232 will be with respect to a single lubrication arrangement 232, with an understanding that all of the lubrication arrangements 232 of the bearing 200 are preferably constructed in an identical manner.

Figure 4:
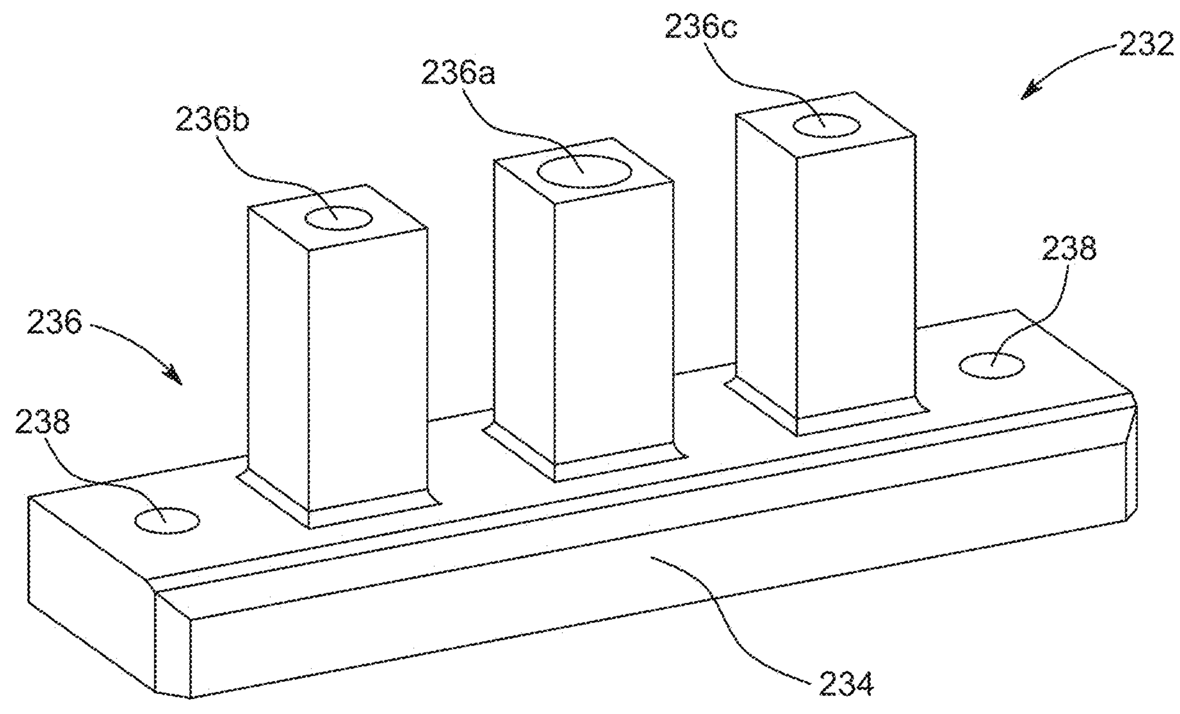
FIG. 4 is a perspective view of a lubrication arrangement configured for use with a tilt pad journal bearing in accordance with one non-limiting embodiment or aspect of the present disclosure.
Figure 5:
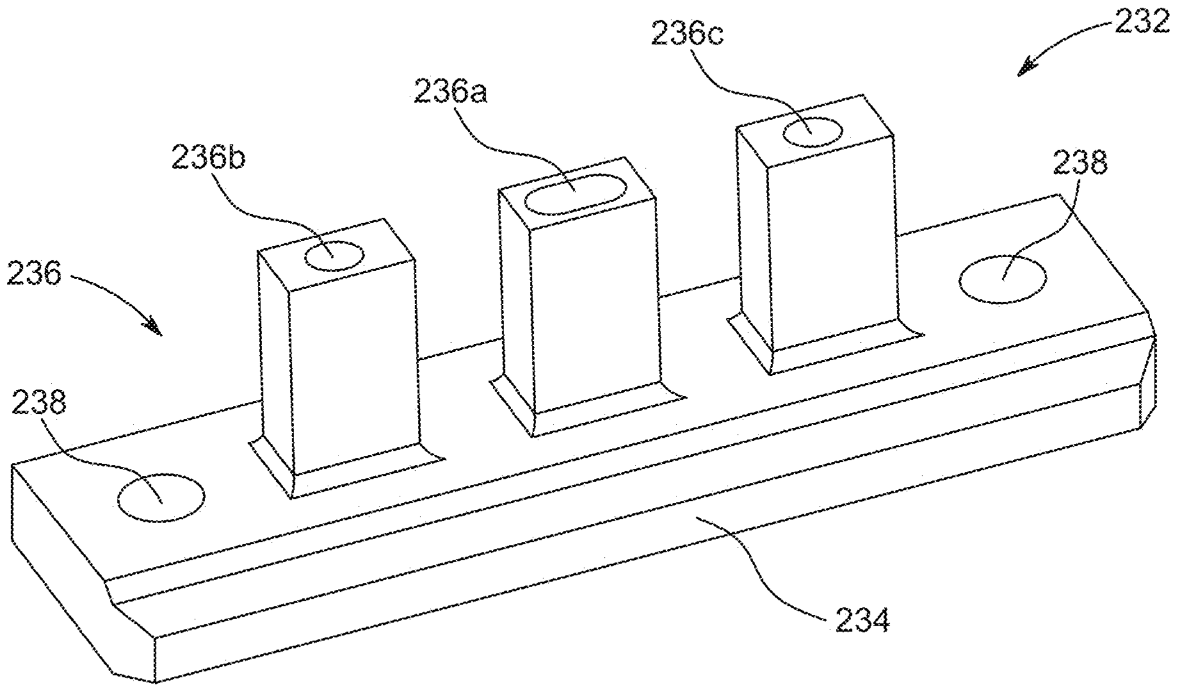
FIG. 5 is a perspective view of a lubrication arrangement configured for use with a tilt pad journal bearing in accordance with another non-limiting embodiment or aspect of the present disclosure.

With reference to FIGS. 4-5, the lubrication arrangement 232 includes a lubrication manifold 234 and a plurality of lubrication nozzles 236 protruding from the lubrication manifold 234. Each of the lubrication nozzles 236 is in fluid communication with the lubrication manifold 234 (see FIG. 6). In some embodiments or aspects, the plurality of lubrication nozzles 236 may be three lubrication nozzles 236. In other embodiments or aspects, the plurality of lubrication nozzles 236 may be more or less than three lubrication nozzles 236.

With reference to FIG. 2, the lubrication manifold 234 is configured to be connected to the annular support ring 202. For example, the lubrication manifold 234 has a pair of threaded holes 238 (shown in FIGS. 4-5), each of which is configured to threadably receive a fastener 240 that extends through a corresponding hole 241 on the annular support ring 202 (see FIGS. 2-3).

Figure 6:
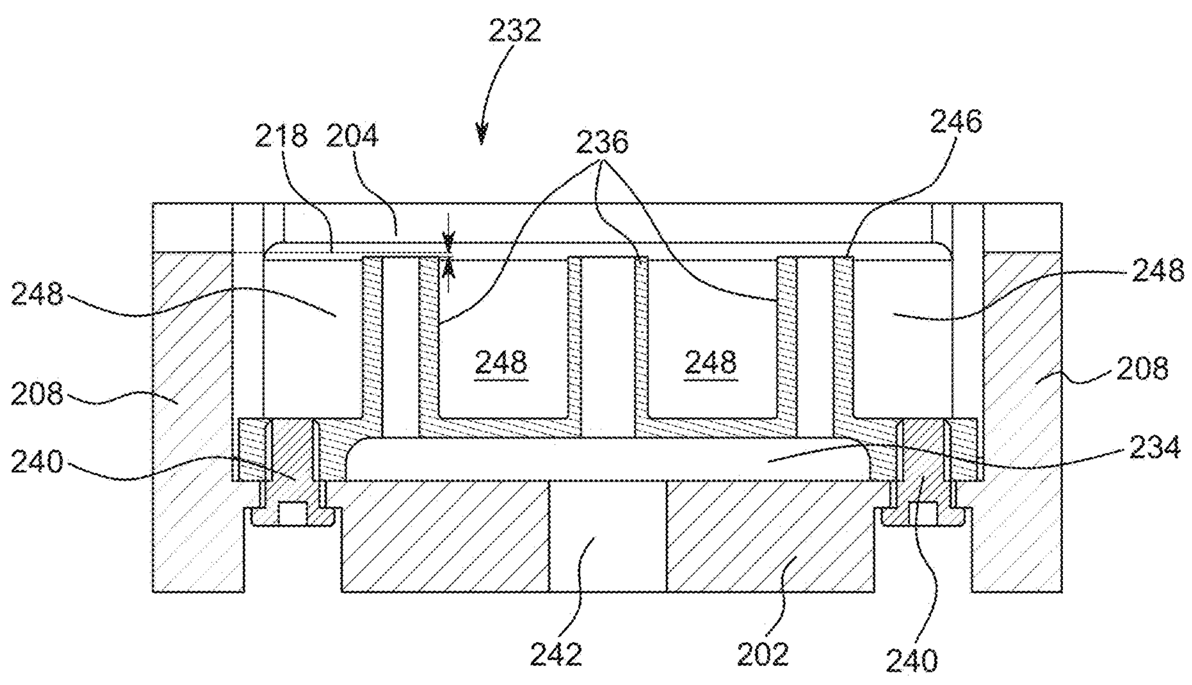
FIG. 6 is a front cross-sectional view of the lubrication arrangement shown in FIG. 4.

As shown in FIG. 6, the annular support ring 202 has a lubricant delivery hole 242 in fluid communication with the lubrication manifold 234 and each of the plurality of lubrication nozzles 236. In this manner, lubricant can be delivered from a lubricant source to the lubrication nozzles 236 via the lubricant delivery hole 242 and the lubrication manifold 234. In some embodiments or aspects, a seal may be provided at the interface between the lubrication manifold 234 and the annular support ring 202 to prevent side leakage of lubricant.

With reference to FIGS. 4-5, each of the lubrication nozzles 236 has a hollow structure configured for delivering lubricant to the rotor shaft via the lubrication manifold 234. The plurality of lubrication nozzles 236 are evenly spaced apart from each other along the lubrication manifold 234. In other embodiments or aspects, the plurality of lubrication nozzles 236 may be unevenly spaced apart from each other along the lubrication manifold 234. A cross-sectional flow area of at least one of the plurality of lubrication nozzles 236 positioned toward a center of the lubrication manifold 234 (i.e., a central lubrication nozzle **236*a*) is larger than a cross-sectional flow area of a remainder of the plurality of nozzles 236 positioned away from the center of the lubrication manifold 234 (i.e., outer lubrication nozzles 236*b*, 236*c*). In this manner, more lubricant can be delivered through the central lubrication nozzle 236*a* relative to outer lubrication nozzles 236*b*, 236*c*. This arrangement provides more efficient cooling of the bearing pad 204, thereby enabling the highest temperature reduction overall, as well as the highest temperature reduction per oil flowrate. In some embodiments or aspects, the central lubrication nozzle 236*a* with the larger cross-sectional flow area has 33% to 200% more flow area than any of the remaining individual lubrication nozzles 236*b*, 236*c***.

In some embodiments or aspects, at least one of the plurality of lubrication nozzles 236 has a circular cross-sectional flow area (FIG. 4). In other embodiments or aspects, at least one of the plurality of lubrication nozzles 236 has an oval cross-sectional flow area (FIG. 5). In further embodiments or aspects, at least one of the plurality of lubrication nozzles 236 may have any other geometric shape of the cross-sectional flow area. At least one of the plurality of lubrication nozzles 236 has a prismatic outer shape. For example, the outer cross-sectional shape of at least one of the plurality of lubrication nozzles 236 may be square, rectangle, or another shape.

With reference to FIG. 6, an upper end 246 of each of the plurality of lubrication nozzles 236 is recessed relative to the shaft support surface 218 of adjacent arcuate pads 204 by a distance X to provide a clearance space relative to the rotor shaft. Furthermore, the lubrication manifold 234 is recessed relative to the upper end 246 of each of the plurality of lubrication nozzles 236 and shaft support surface 218 of adjacent arcuate pads 204 to define an oil mixing cavity 248. The oil mixing cavity 248 is configured to receive hot lubricant that may drain from the adjacent arcuate pads 204 so that it may be mixed with the cooler lubricant delivered from the lubrication nozzles 236. In this manner, an overall bearing metal temperature can be reduced.

With reference to FIG. 7, at least one temperature transducer 250 is connected to at least one of the plurality of arcuate pads 204. The at least one temperature transducer 250 is configured for measuring the operating temperature of the bearing 200. In some embodiments or aspects, the at least one temperature transducer 250 may be in axial alignment with at least one of the plurality of lubrication nozzles 236 with the larger cross-sectional flow area.

While various aspects of the disclosed bearing and turbomachine were provided in the foregoing description, those skilled in the art may make modifications and alterations to these aspects without departing from the scope and spirit of the invention. For example, it is to be understood that this disclosure contemplates that, to the extent possible, one or more features of any aspect can be combined with one or more features of any other aspect. Accordingly, the foregoing description is intended to be illustrative rather than restrictive. The invention described hereinabove is defined by the appended claims and all changes to the invention that fall within the meaning and the range of equivalency of the claims to be embraced within their scope.

The invention claimed is:

1. A tilt pad journal bearing for supporting a rotating shaft, the tilt pad journal bearing comprising:

an annular support ring;

a plurality of arcuate pads tiltably mounted in the annular support ring and circumferentially spaced apart from each other, each of the plurality of arcuate pads having a mounting surface opposite a shaft support surface; and a lubrication arrangement disposed between adjacent pads of the plurality of arcuate pads, the lubrication arrangement comprising a plurality of lubrication nozzles protruding into an oil mixing cavity between the adjacent pads, wherein a cross-sectional flow area of an outlet of at least one of the plurality of lubrication nozzles is larger than a cross-sectional flow area of an outlet of a remainder of the plurality of lubrication nozzles.

2. The tilt pad journal bearing of claim 1, wherein the lubrication arrangement further comprises a lubrication manifold connected to the annular support ring and recessed relative to the shaft support surface of adjacent arcuate pads to define the oil mixing cavity, and wherein the plurality of lubrication nozzles protrudes from the lubrication manifold into the oil mixing cavity between the adjacent arcuate pads and the lubrication manifold.

3. The tilt pad journal bearing of claim 2, wherein the annular support ring has a lubricant delivery hole in fluid communication with the lubrication manifold and each of the plurality of lubrication nozzles.

4. The tilt pad journal bearing of claim 2, wherein the lubrication manifold comprises at least one threaded hole, and wherein the lubrication manifold is connected to the annular support ring via a fastener threadably engaged with the at least one threaded hole.

5. The tilt pad journal bearing of claim 1, wherein the plurality of lubrication nozzles is three lubrication nozzles.

6. The tilt pad journal bearing of claim 1, wherein the at least one of the plurality of lubrication nozzles with the larger cross-sectional flow area has 33% to 200% more flow area than any of the remaining lubrication nozzles.

7. The tilt pad journal bearing of claim 1, wherein the at least one of the plurality of lubrication nozzles has a circular cross-sectional flow area.

8. The tilt pad journal bearing of claim 1, wherein the at least one of the plurality of lubrication nozzles has an oval cross-sectional flow area.

9. The tilt pad journal bearing of claim 1, wherein the at least one of the plurality of lubrication nozzles has a prismatic outer shape.

10. The tilt pad journal bearing of claim 1, further comprising a spherical pivot seat in contact with the mounting surface of each of the plurality of arcuate pads.

11. The tilt pad journal bearing of claim 10, wherein the spherical pivot seat is connected to an inner surface of the annular support ring.

12. The tilt pad journal bearing of claim 1, wherein an upper end of the plurality of lubrication nozzles is recessed relative to the shaft support surface of adjacent arcuate pads.

13. The tilt pad journal bearing of claim 1, further comprising a pair of end seals connected to the annular support ring.

14. The tilt pad journal bearing of claim 1, further comprising at least one temperature transducer connected to at least one of the plurality of arcuate pads.

15. The tilt pad journal bearing of claim 14, wherein the at least one of the plurality of lubrication nozzles with the larger cross-sectional flow area is positioned in axial alignment with the at least one temperature transducer.

16. A tilt pad journal bearing for supporting a rotating shaft, the tilt pad journal bearing comprising:

an annular support ring;

a plurality of arcuate pads tiltably mounted in the annular support ring and circumferentially spaced apart from each other, each of the plurality of arcuate pads having a mounting surface opposite a shaft support surface; and a lubrication arrangement disposed between adjacent pads of the plurality of arcuate pads, the lubrication arrangement comprising a plurality of lubrication nozzles protruding into an oil mixing cavity between the adjacent pads, wherein a cross-sectional flow area of an outlet of at least one of the plurality of lubrication nozzles is larger than a cross-sectional flow area of an outlet of a remainder of the plurality of lubrication nozzles, and wherein an upper end of the plurality of lubrication nozzles is recessed relative to the shaft support surface of adjacent arcuate pads, and wherein the annular support ring has a lubricant delivery hole in fluid communication with each of the plurality of lubrication nozzles.

17. The tilt pad journal bearing of claim 16, wherein the lubrication arrangement further comprises a lubrication manifold connected to the annular support ring and recessed relative to the shaft support surface of adjacent arcuate pads to define the oil mixing cavity, and wherein the plurality of lubrication nozzles protrudes from the lubrication manifold into the oil mixing cavity between the adjacent pads and the lubrication manifold.

18. The tilt pad journal bearing of claim 16, wherein the at least one of the plurality of lubrication nozzles with the larger cross-sectional flow area has 33% to 200% more flow area than any of the remaining lubrication nozzles.

19. The tilt pad journal bearing of claim 16, wherein the at least one of the plurality of lubrication nozzles has a circular or oval cross-sectional flow area, and wherein the at least one of the plurality of lubrication nozzles has a prismatic outer shape.

20. The tilt pad journal bearing of claim 16, further comprising a pair of end seals connected to the annular support ring.

* * * * *